United States Patent [19]

Haiges

[11] 4,055,149

[45] Oct. 25, 1977

[54] NECK FRAME FOR CATTLE

[75] Inventor: Adolf Haiges, Bonnigheim, Germany

[73] Assignee: Firma Suevia Haiges KG, Kirchheim, Germany

[21] Appl. No.: 714,502

[22] Filed: Aug. 16, 1976

[30] Foreign Application Priority Data

Aug. 14, 1975 Germany .............................. 7525811
May 19, 1976 Germany .............................. 2622172

[51] Int. Cl.² .......................... A01K 1/06; A01K 1/08
[52] U.S. Cl. .................................. 119/147 A; 119/148
[58] Field of Search ............... 119/147, 148, 149, 150, 119/98

[56] References Cited

U.S. PATENT DOCUMENTS

| 1,857,412 | 5/1932 | Sutton | 119/149 |
| 1,888,608 | 11/1932 | Rassmann | 119/148 |
| 1,953,875 | 4/1934 | Babson | 119/148 |

Primary Examiner—Hugh R. Chamblee
Attorney, Agent, or Firm—Wigman & Cohen

[57] ABSTRACT

This disclosure relates to an automatically-catching neck frame for cattle which is adapted to be suspended in a cattle stand. The neck frame includes an inverted essentially U-shaped main frame having a head opening and a neck opening for the animal. A closing lever is mounted on the frame such that when the animal puts his head through the head opening and then lowers its neck downwardly through the neck opening so as to reach the manger, the closing lever will be automatically actuated to close and lock in place so that the animal is prevented from pulling its head out of the frame.

10 Claims, 8 Drawing Figures

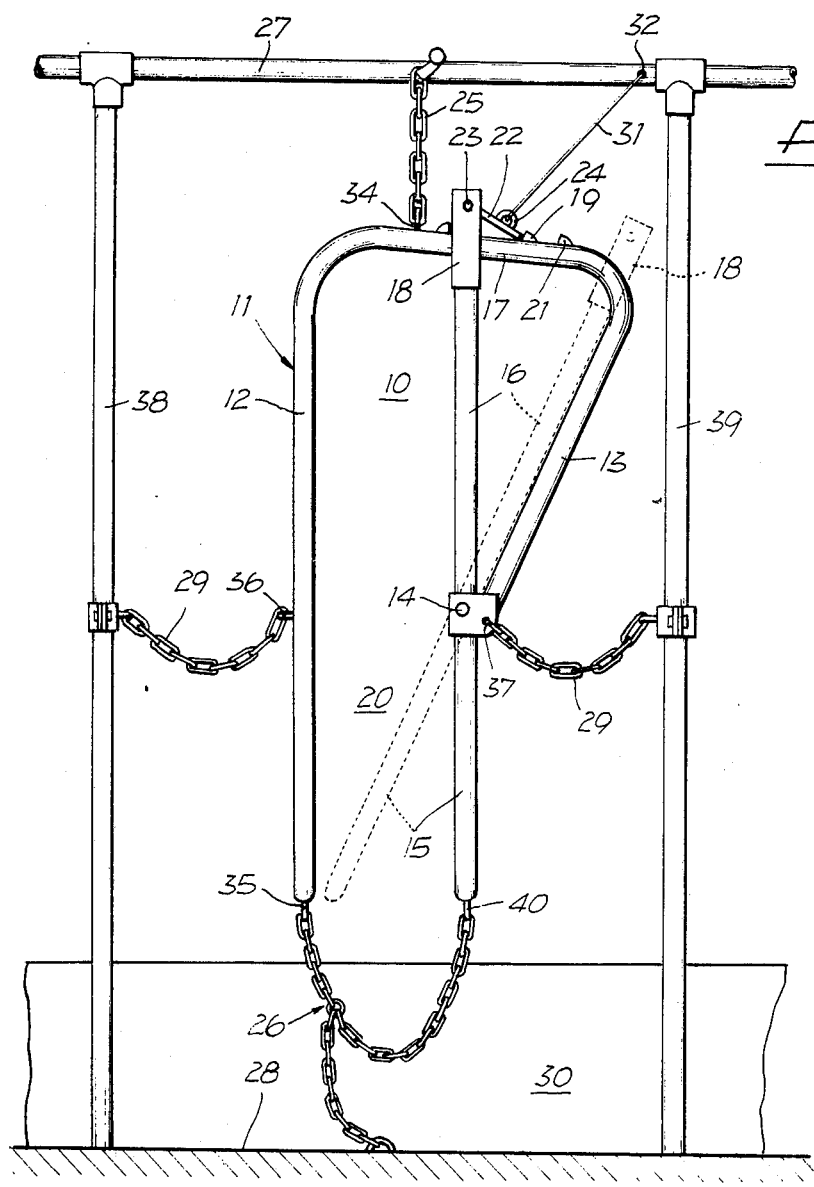
Fig. 1
Fig. 2

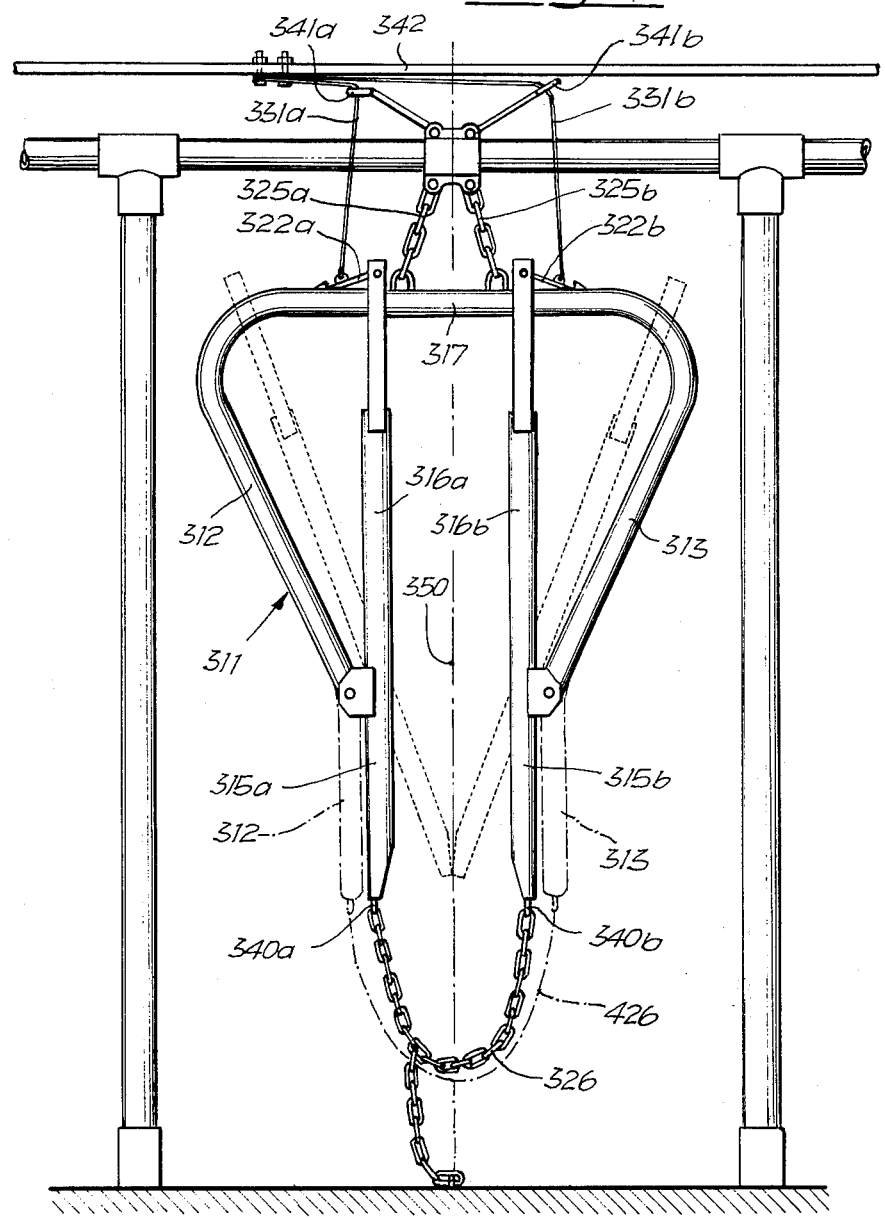

NECK FRAME FOR CATTLE

BACKGROUND OF THE INVENTION

This invention relates to a neck frame for cattle comprising an essentially U-shaped main frame which can be suspended in a cattle stand and includes two shanks with a connecting crosspiece. The shanks partially encircle a head opening through which the animal can pass its head. At the bottom of the frame the head opening changes into a neck opening for the neck of the animal.

A primary object of the invention is to provide a neck frame for cattle that may be suspended in front of a manger in such a way that the animal can only reach the manger by passing its head through the head opening of the neck frame, the head of the animal being automatically caught in the neck frame when it passes its head through the head opening.

The foregoing is accomplished in accordance with the invention by providing a neck frame with a closing lever having an actuation arm and a closing arm and being pivoted on one of the shanks of the main frame around an axis perpendicular to the plane of the frame. The construction is such that with the open position of the closing lever, the actuation arm narrows the neck opening and the closing arm releases the head opening. When the animal puts its head through the head opening, the actuation arm is pushed out of the neck opening by the neck of the animal so that the closing arm narrows the head opening and prevents the animal from pulling its head out of the main frame. A locking device automatically locks the closing lever in its closing position, thus preventing the animal from freeing itself from the neck frame.

Another object of this invention is to provide a neck frame for cattle that is simple and economical to manufacture. This is accomplished by constructing the main frame such that a part thereof stretches over the head opening and includes a guide for the free end of the closing arm and a mounting arrangement for the locking device. Consequently, the neck frame consists of relatively few parts and thus its manufacture is extremely inexpensive.

Another object of this invention is to provide a neck frame for cattle that may be mounted such that its freedom of movement is restricted only by flexible connections, for example chains, holding it in the cattle stand. In particular, the neck frame should not extend downwardly so far that it stretches over a partition separating the cattle stand from the manager. Such a construction would actually yield the result that the forward freedom of movement of the neck frame would be limited because the lower part of the frame would hit against this partition. When an animal gets up after having been lying down, the upper part of its body makes a forward movement. If the neck frame would stretch over the partition separating the cattle stand from the manager, then it would be very difficult or even impossible for the animal to get up because this would restrict its movements.

The foregoing problem has been solved in accordance with this invention by constructing the crosspiece of the main frame such that it forms the part stretching over the head opening of the main frame, and the two shanks limit the head opening at its sides. The shank supporting the closing lever then approaches the other shank up to the neck opening below its area limiting the upper part of the head opening. Because the essentially U-shaped main frame is suspended, so to speak, upside down, the shanks of the frame can be shortened such that they can swing beyond the partition separating the cattle stand from the manger. The lower open portion of the neck opening of the main frame can then be closed with a flexible connection, for example, a suspension chain.

With the above and other objects in view that may become hereinafter apparent, the nature of the invention will be more clearly understood by reference to the attached drawings, the following detailed description thereof, and the appended claimed subject matter; wherein:

FIG. 1 is an elevation view of one embodiment of a neck frame constructed in accordance with this invention, and illustrates the closing lever in its closed position in full lines, and in its open position in dotted lines;

FIG. 2 is a side elevation view of the closing arm illustrated in FIG. 1;

FIG. 8 is an elevation view of yet another embodiment of the neck frame of this invention, illustrated in full lines, with a modification thereof illustrated in broken dash and dot lines.

DETAILED DESCRIPTION OF PREFERRED EMBODIMENTS

Figure 3:
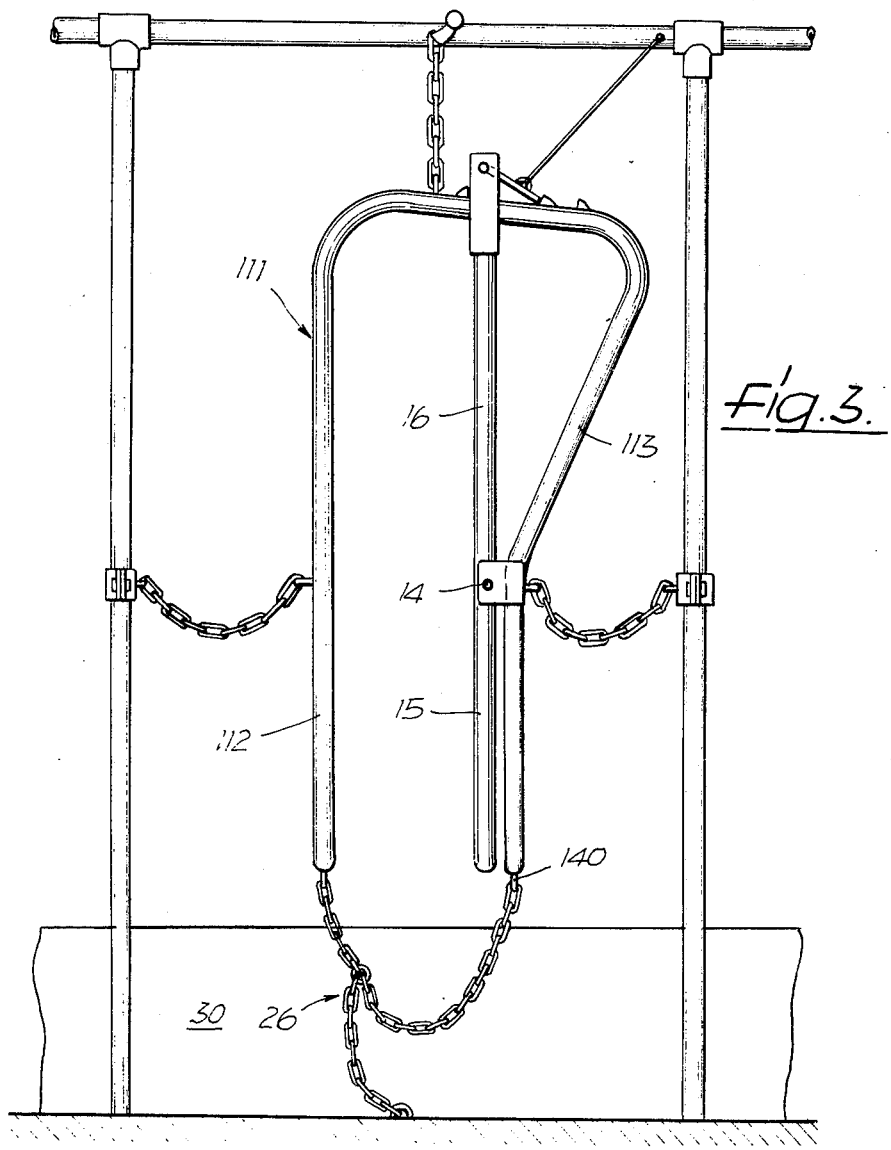
FIGS. 3-5 are elevation views of other embodiments of the neck frame of this invention.

There is illustrated in FIG. 1 an automatically-catching neck frame for cattle having an essentially inverted U-shaped main frame 11, including a long shank 12, a short shank 13 and a crosspiece 17 connecting both shanks. The short shank 13, the crosspiece 17 and the upper half of the long shank 12 opposite the short shank 13 define a head opening 10 through which the animal can easily put its head. In this instance, the shank 13 runs at an angle to the shank 12 so that its lower end approaches the shank 12. At the free end of the short shank 13, a two-arm closing lever 15, 16 is pivoted from the closed position, illustrated in full lines in FIG. 1, into the open position, shown in dotted lines in FIG. 1, around a horizontal axle 14 which is perpendicular to the plane of the main frame 11. The closing lever 15, 16 has a lower actuation arm 15 and an upper closing arm 16 and is arranged in the space surrounded by the main frame 11 where it extends in the plane of the main frame 11. At the free end of the closing arm 16, a yoke member 18 is fastened as a guide into which the crosspiece 17 of the main frame locks. The actuation arm 15 of the closing lever 15, 16, together with the lower half of the long shank 12, limits, on the sides, a neck opening 20 for the neck of the animal to be held by the automatically-catching neck frame. In the open position of the closing lever 15, 16, the closing arm 16 releases the head opening 10, as can be seen from FIG. 1, so that the animal can put its head through the head opening. In this position of the closing lever 15, 16, the actuation arm 15 narrows the neck opening 20 of the main frame.

In order to lock the closing lever 15, 16 in its closed position, two notches 19 and 21 are provided on the upper side of the crosspiece 17 which interact with a locking lever 22. The locking lever 22 is, above the crosspiece 17, fastened to the yoke 18 and is pivoted around a horizontal axle 23 and designed as a flap with a handle 24. This locking lever 22 rests with its weight on the upper side of the crosspiece 17 so that, with the closing movement of the closing lever, it skips first over the notch 21 and then over the notch 19 and is prevented from an opening movement by these notches. In order to assist the closing movement of the locking lever 22, a spring (not shown) can be provided biassing it in the locking position.

The neck frame is advantageously mounted in a short stand frame having vertical shanks 38, 39 and a horizontal shank 27. In order to connect the automatically-catching neck frame in a movable manner with the short stand frame and the floor 28 of the stable, the main frame 11 has at its crosspiece 17 a connecting element 34 and at its shanks 12 and 13 connecting elements 35, 36 and 37, respectively, as well as at its free end of the closing arm 15 of the closing lever 15, 16, a connecting element 40 for suspension chains 25, 26 and 29. The suspension chains 26 for the connection with the floor of the stable 28 has three branches, the one lower branch of which is connected with the floor 28 of the stable and the two upper branches with the connecting elements 35 and 40 of the shank 12 or of the actuation arm 15 so that the neck opening 20 is closed towards the bottom by the chain 26. By means of the upper chain 25, the height of the automatically-catching neck frame is determined in such a way that the lower ends of the long shank 12 and of the actuation arm 15 end at a distance above a partition 30 which defines the edge of a manger adjacent the short stand. The lower chain 26 limits the path of the animal to the manger and to its resting place, and its length can be chosen so as to permit the animal to move freely within the short stand and, particularly, to get up from its lying position. In order to provide added support for the neck frame and to prevent the animal from passing through the opening adjacent the neck frame, the two shanks 12 and 13 of the neck frame are connected by the two, essentially-horizontally-running chains 29 with the vertical shanks 38 and 39 of the short stand frame. For this purpose, it is expedient to arrange the chains 29 in a sagging manner so that the neck frame and thus the head of the animal have a sufficient freedom of movement. The chain connecting elements, particularly the connecting elements 36 and 37, are detachable so that in winter the chains 29 can be taken off and thus a greater freedom of movement can be given to the animals. Instead of chains, other flexible means, such as ropes, etc., can be provided.

In order to unlock the locking lever 22 for the purpose of swinging open the closing lever 15, 16, the handle 24 is connected to a string 31 with a point of attachment 32 which is arranged at the outer end of a lever which projects horizontally and radially from the upper shank 27; this shank 27 can be pivoted around its longitudinal axis. This point of attachment 32 is, in this instance, arranged in a staggered manner in the direction in which the yoke 18 of the closing lever 15, 16 is swung open.

In order to secure an animal in the automatically-catching neck frame of FIG. 1, the closing lever 15, 16 is placed in its open position by turning the upper shank 27 of the short stand frame around its axis whereby the locking lever 22 is lifted out of its position into which it is locked by the notch 19 and the closing lever 15, 16 in FIG. 1 is swung around its axle 14 in a clockwise movement.

When the animal wants to get to the manger, it cannot pass by the chains 29 and, therefore, it must put its head into the automatically-catching neck frame. However, if the animal would want to force its head through the space between the short shank 13 and the shank 39 of the short stand frame, then the automatically-catching neck frame is pushed towards the side without closing the closing lever 15, 16 since the short shank 13 prevents the head of the animal from swinging the closing arm 16 closed from the outside. When passing the head through the head opening 10 of the automatically-catching neck frame, the neck of the animal pushes the actuation arm 15 of the closing lever 15, 16 downward so that the closing lever is swung from its open position, as shown in dotted lines in FIG. 1, in a counter-clockwise direction into its closing position. With this swinging movement, the locking lever 22 slides along the upper side of the crosspiece 17 until it skips over the first notch 21. From now on, the closing lever 15, 16 cannot be swung open by the animal, even if it does not put its head any deeper into the automatically-catching neck frame. When penetrating further into the automatically-catching neck frame or when lowering the head into the manger behind the partition 30, the closing lever 15, 16 is further swung in a counter-clockwise direction until the locking lever 22 locks behind the second notch 19. In this manner, the animal is automatically caught in the automatically-catching neck frame.

When the animal is to be released from the automatically-catching neck frame, then the upper shank 27 of the short stand frame is turned around its longitudinal axis in such a manner that the point of attachment 32 for the string 31 moves upwardly. In this way, the locking lever 22 is lifted and, simultaneously, a tension is exerted on the closing arm 16 of the closing lever 15, 16 by means of which it is swung into its open position, shown in FIG. 1 in dotted lines, so that the animal can pull its head out of the automatically catching neck frame. The closing arm 16 of the closing lever is longer than its actuation arm 15 so that the movement causing the swinging open of the closing arm 16 is completed by its overweight until it comes to rest next to the short shank 13 which prevents it from swinging open further.

The embodiment of the automatically-catching neck frame shown in FIG. 3 differs from the embodiment shown in FIG. 1 only by the fact that, in this instance, the shank 113 of the main frame 111 supporting the closing lever 15, 16 projects downward to the same level as the long shank 112 below the swinging axle 14 of the closing lever 15, 16 in parallel to the long shank. In the case of this embodiment, the actuation arm 15 of the closing lever 15, 16 has no connecting element 40 for the chain 26. Instead, the lower end of the shank 113 is provided with a corresponding connecting element 140. This construction is somewhat more expensive from the point of material than the construction according to FIG. 1 but it has, in comparison with it, the advantage that the chain 26 cannot interfere in any way with the movement of the closing lever 15, 16.

Figure 4:
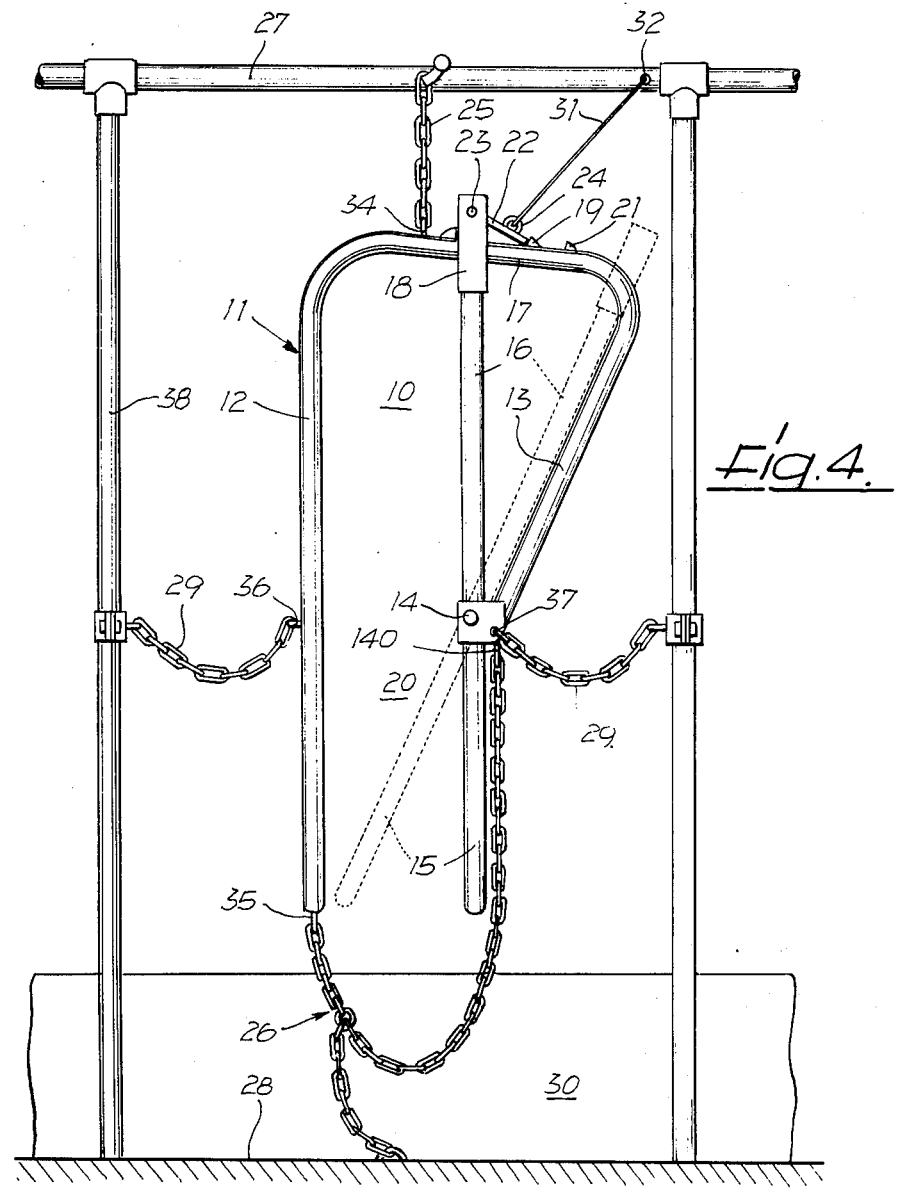

In the case of the embodiment shown in FIG. 4, the construction of FIG. 1 is modified in such a manner that, instead of the connecting element 40 at the free end of the actuation arm 15 for the chain 26, a connecting element 140 is provided at the lower end of the short shank 13 so that the chain 26 forms an additional lateral limitation of the neck opening 20 besides the actuation arm 15. By means of this suspension, the neck frame permits an even greater movability.

Figure 5:
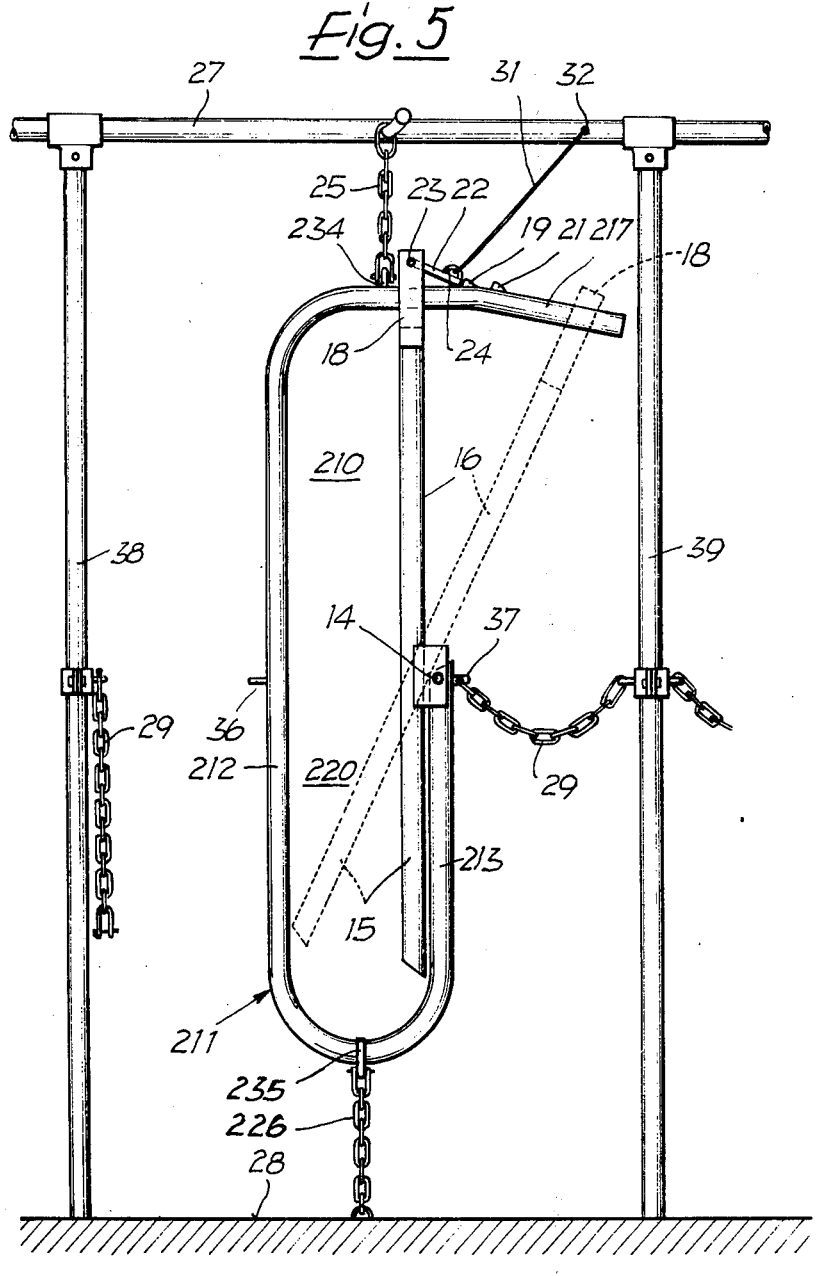

The embodiment of the invention according to FIG. 5 differs from the embodiment according to FIG. 1 in such a manner that, in this instance, the essentially U-shaped frame 211 is suspended in an upright position in the animal stand so that the crosspiece of the U-shaped frame defines the neck opening 220 at its bottom and the two shanks 212 and 213 project upwardly. The upper end 217 of the longer shank 212 is bent towards the right in FIG. 5 in such a manner that it forms the part of the main frame 212 extending over the head opening 210 which engages into the yoke 18 provided for guiding the closing lever 15, 16 at the free end of the closing arm 16 and supports the notches 19 and 21 for the locking lever 22 as well as the connecting element 234 for the chain 25. The crosspiece of the main frame 211 is provided, in its center, with a connecting element 235 for a chain 226 connecting the main frame with the floor 28.

In the case of the automatically-catching neck frame illustrated in FIG. 5, care must be taken that the lower part of the main frame 211 is at an elevation high enough to assure that it does not hit against the partition 30 shown in FIG. 1.

Figure 6:
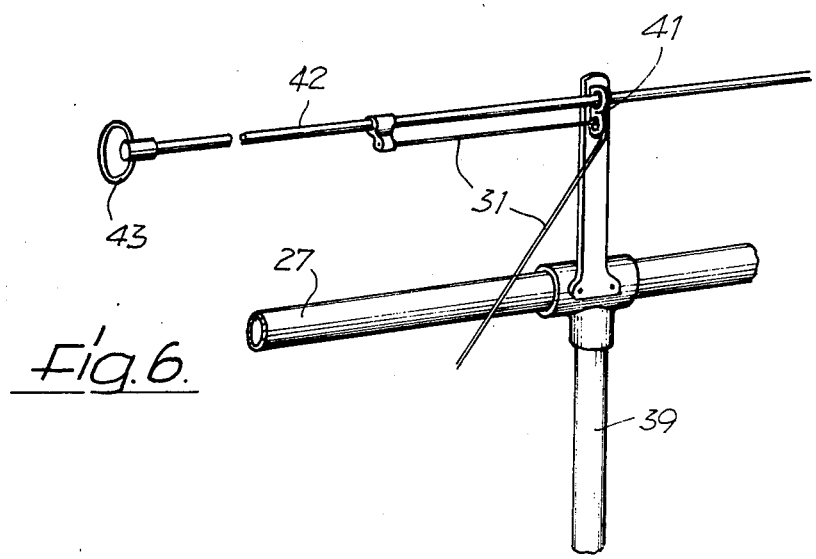
FIGS. 6 and 7 are fragmentary perspective views of alternate modifications of actuation means for the locking levers adapted to be used with any of the embodiments of this invention.

In FIG. 6, a modification of a device for the lifting of the locking lever 22 is shown which can be used with any of the embodiments of the invention described above. At each connecting element between the horizontal, continuous shank 27 and at each vertical shank 38 and 39 of the short stand frame, one double eye bracket 41 is attached. In the upper openings of this double eye bracket 41, a rod 42, which can be moved axially, is arranged as a common actuation element of the several locking levers 22 of each of a plurality of individual short stands arranged in a row next to each other. The rod 42 has a handle 43 which is shown at its left end in FIG. 6. The lower opening of the double eye bracket 41 is provided as the connecting point for the cord 31, the end of which, after being passed through this lower opening of the eye, is connected with the rod 42 so that, by means of an axial movement of the rod 42 in FIG. 6 from the right to the left, all locking levers connected with the rod 42 are lifted and the respective closing levers 15, 16 are swung into their opening position.

Figure 7:
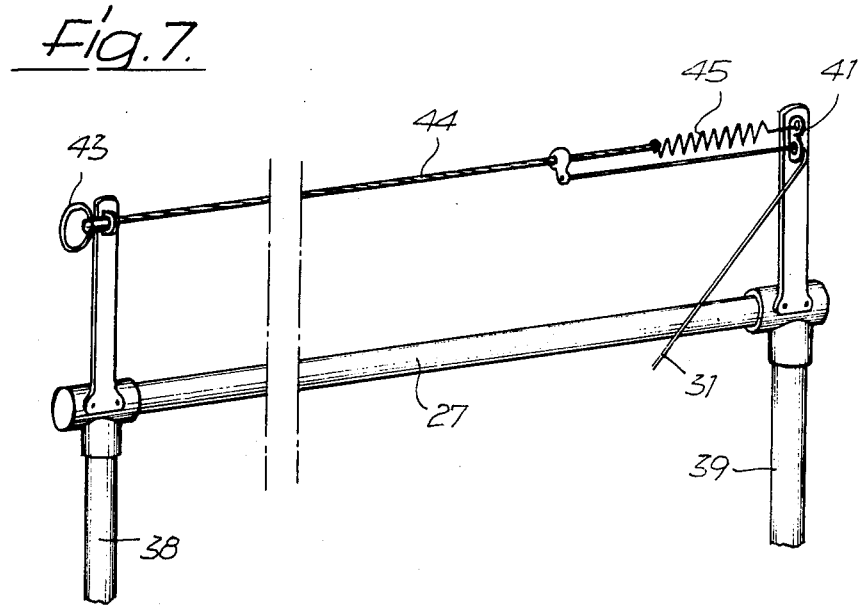

In the modification illustrated in FIG. 7, instead of the rod 42, a second cord 44 is provided, the right end of which in FIG. 7 is connected with the last eye 41 by means of a spring 45 and the other end of which is also provided with a handle 43 which is urged against the first eye 41 at the left in FIG. 7 by means of the force of the spring 45. When the handle 43 is pulled towards the left into its release position from the locking position shown in FIG. 7, then all locking levers connected with the cord 44 are lifted and the corresponding closing levers 15, 16 are swung open.

Instead of the cords 31 and 44, any other traction means, such as chains, can be provided. Furthermore, the chains 25, 26 and 29 can be replaced by other flexible elements, for example, ropes, belts and the like.

The embodiment of the invention illustrated in FIG. 8 differs only from the embodiment according to FIG. 1 in that the main frame 311 is symmetrical by constructing the left shank 312 of the main frame exactly like the right shank 313 whereby each of these two shanks supports a closing lever 315a, 316a, or 315b, 316b, respectively, at its free end. Accordingly, the device for the lifting of the two locking levers 322a and 322b is also available in duplicate and that, in the illustrated construction corresponding to the device shown in FIG. 6, whereby, in this instance, the rod 342 is connected with two cords 331a and 331b which are passed through two eyes 341a or 341b, respectively. In the case of this embodiment of the invention, the lateral chains 29 of the preceding embodiment are omitted. Instead, two chains 325a and 325 b are connected to the crosspiece 317 of the main frame 311 which prevent a swinging of the main frame 311 around the vertical center axis 350. The lower chain 326 is, in this instance, connected with connecting elements 340a and 340b at the free end of the arms 315a and 315b of the closing levers.

This symmetrical design of the main frame 311 can also be used with the design according to FIG. 3 as shown in FIG. 8 in dotted lines, whereby the chain 426 then is connected to the lower ends of the extended shanks 312 and 313.

Although only preferred embodiments of the invention have been specifically illustrated and described herein, it is to be understood that minor modifications could be made therein without departing from the spirit of the invention.

What is claimed is:

1. A neck frame for cattle adapted to be suspended in a cattle stand comprising an essentially U-shaped frame including two generally vertically extending shanks and a connecting crosspiece, said frame defining an upper head opening adapted to receive the head of an animal and a lower neck opening for the neck of the animal, each of said shanks having a free end adjacent said neck opening, means flexibly connecting the free ends of said shanks and adapted to be connected to the floor of a stable for defining the lower portion of said neck opening, a closing lever having upper and lower free ends and being pivotally mounted near its midpoint on one of said shanks about an axis extending perpendicular to the plane of said frame, said lever having an upper closing arm and a lower actuation arm, said lever being pivotable from an open position wherein said closing arm is spaced from the other one of said shanks to permit the animal to pass its head through said head opening to a closed position wherein said closing arm approaches said other one of said shanks to prevent the animal from pulling its head out of the frame, means for automatically locking said closing lever in said closed position, said crosspiece comprising a generally horizontal portion extending over said head opening, said free end of said closing arm being connected to guide means movable along said horizontal portion of said frame, and wherein said locking means is interconnected between said guide means and said horizontal portion of said frame.

2. A neck frame as defined in claim 1, said closing lever being movable in a planar region defined by said frame and said shanks providing stops therefor, and wherein said locking means include a locking lever having one end pivotally mounted on said guide means and its other end engageable in at least one notch provided on said horizontal portion of said frame.

3. A neck frame as defined in claim 2, further including means connected to said locking lever for releasing said locking lever from engagement with said at least one notch.

4. A neck frame as defined in claim 1, wherein said shanks are of unequal lengths, the shorter one of said shanks having a free end upon which said closing lever is pivotally mounted, said horizontal portion of said frame extending over said head opening being defined by an upper bent portion of the longer one of said shank, and wherein the shorter shank, the lower portion of the longer shank and said connecting crosspiece define said neck opening.

5. A neck frame as defined in claim 1, wherein said shank upon which said closing lever is pivotably mounted approaches said other shank in the region of said neck opening.

6. A neck frame as defined in claim 1, further including means for connecting said shanks and said horizontal portion of said frame to the cattle stand.

7. A neck frame for cattle adapted to be suspended in a cattle stand comprising an essentially U-shaped frame including two generally vertically extending shanks and a connecting crosspiece said frame defining an upper head opening adapted to receive the head of an animal and a lower neck opening for the neck of the animal, a closing lever having upper and lower free ends and being pivotally mounted near its midpoint on one of said shanks about an axis extending perpendicular to the plane of said frame, said one shank approaching the other one of said shanks in the region of said neck opening, said lever having an upper closing arm and a lower actuation arm, said lever being pivotable from an open position wherein said closing arm is spaced from said other one of said shanks to permit the animal to pass its head through said head opening to a closed position wherein said closing arm approaches said other one of said shanks to prevent the animal from pulling its head out of the frame, means for automatically locking said closing lever in said closed position, said crosspiece comprising a generally horizontal portion extending over said head opening, said free end of said closing arm being connected to guide means movable along said horizontal portion of said frame, said locking means being interconnected between said guide means and said horizontal portion of said frame, said shanks being of unequal lengths, the shorter one of said shanks having a free end upon which said closing lever is pivotally mounted, and a flexible line connected at one end to the longer shank at the lower end thereof and which is adapted to be connected to the floor of the stable, said flexible line further defining the lower portion of said neck opening.

8. A neck frame as defined in claim 7, wherein said flexible line is connected at its other end to the free end of said actuation arm.

9. A neck frame as defined in claim 7, wherein said flexible line is connected at its other end to the free end of said shorter shank.

10. A neck frame for cattle adapted to be suspended in a cattle stand comprising an essentially U-shaped frame including two generally vertically extending shanks and a connecting crosspiece, said frame defining an upper head opening adapted to receive the head of an animal and a lower neck opening for the neck of the animal, a closing lever having upper and lower free ends and being pivotally mounted near its midpoint on one of said shanks about an axis extending perpendicular to the plane of said frame, said one shank approaching the other one of said shanks in the region of said neck opening, said lever having an upper closing arm and a lower actuation arm, said lever being pivotable from an open position wherein said closing arm is spaced from said other one of said shanks to permit the animal to pass its head through said head opening to a closed position wherein said closing arm approaches said other one of said shanks to prevent the animal from pulling its head out of the frame, means for automatically locking said closing lever in said closed position, said crosspiece comprising a generally horizontal portion extending over said head opening, said free end of said closing arm being connected to guide means movable along said horizontal portion of said frame, said locking means being interconnected between said guide means and said horizontal portion of said frame, said shanks being of substantially the same vertical extent, and means flexibly connected to the lower ends of said shanks and adapted to be connected to the floor of the stable for defining the lower portion of said neck opening.

* * * * *